US010220804B2

(12) United States Patent
Sedique et al.

(10) Patent No.: US 10,220,804 B2
(45) Date of Patent: Mar. 5, 2019

(54) FOG LAMP ATTACHMENT BRACKET WITH INTEGRATED AIR CURTAIN DUCT AND FASCIA SUPPORT

(71) Applicant: Ford Global Technologies, LLC, Dearborn, MI (US)

(72) Inventors: Wahid Sedique, Ottawa Hills, OH (US); Ira Jason Goldberg, Ann Arbor, MI (US); Jorge Alberto Alarcon Chagoya, Tepotzotlán (MX); Gerardo Velazquez Monroy, Nicolas Romero (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/254,597

(22) Filed: Sep. 1, 2016

(65) Prior Publication Data

US 2018/0056909 A1    Mar. 1, 2018

(51) Int. Cl.
| | |
|---|---|
| *B60R 19/50* | (2006.01) |
| *B60R 19/02* | (2006.01) |
| *B62D 37/02* | (2006.01) |
| *B60Q 1/20* | (2006.01) |
| *B60Q 1/04* | (2006.01) |

(52) U.S. Cl.
CPC ............ *B60R 19/50* (2013.01); *B60Q 1/0408* (2013.01); *B60Q 1/20* (2013.01); *B60R 19/023* (2013.01); *B62D 37/02* (2013.01); *B60R 2019/505* (2013.01)

(58) Field of Classification Search
CPC combination set(s) only.
See application file for complete search history.

(56) References Cited

U.S. PATENT DOCUMENTS

| | | | |
|---|---|---|---|
| 6,443,608 B1 | 9/2002 | Storck et al. | |
| 7,841,651 B2 | 11/2010 | Crainic et al. | |
| 2003/0189837 A1* | 10/2003 | Potter | B60R 3/002 362/495 |
| 2003/0221891 A1* | 12/2003 | Fecteau | B62J 1/12 180/210 |
| 2015/0225026 A1* | 8/2015 | Ohira | B62D 25/08 296/180.1 |

FOREIGN PATENT DOCUMENTS

| | | |
|---|---|---|
| CN | 102416917 | 4/2012 |
| EP | 0208923 | 9/1989 |
| JP | 06270736 | 9/1994 |
| JP | 07117555 | 5/1995 |
| JP | 10305786 | 11/1998 |

* cited by examiner

*Primary Examiner* — Nimeshkumar Patel
*Assistant Examiner* — Jacob R Stern
(74) *Attorney, Agent, or Firm* — Jason Rogers; Price Heneveld LLP

(57) ABSTRACT

A bumper assembly for a vehicle includes a bumper fascia having inner and outer surfaces. A support member is welded to the inner surface and at least partially surrounding a fog-lamp aperture. The support member reinforces the bumper fascia proximate the fog-lamp aperture. An air curtain duct integrally formed within the support member, the air curtain duct placing the outer surface in communication with a vehicle compartment.

20 Claims, 6 Drawing Sheets

FOG LAMP ATTACHMENT BRACKET WITH INTEGRATED AIR CURTAIN DUCT AND FASCIA SUPPORT

FIELD OF THE INVENTION

The present invention generally relates to vehicle front end assemblies, and more specifically, a front fascia of a vehicle bumper having an interior fog lamp attachment that includes an integral air curtain duct and fascia support.

BACKGROUND OF THE INVENTION

Within various automobiles, a front fascia panel near the vehicle bumper includes openings for headlamps, fog lamps, turn signals, and other types of vehicle lighting. The position of these light fixtures can affect the interior support for the fascia panel and can so negatively impact aerodynamics of the vehicle. Accordingly, certain lighting fixtures, such as fog lamps, may have covers that incorporate vents for improving aerodynamics near the fascia panel.

SUMMARY OF THE INVENTION

According to one aspect of the present invention, a vehicle includes a bumper fascia having a fog-lamp aperture and a front vent. A support member is disposed on the inner surface of the bumper assembly, the support member defining an outer frame that supports a fog lamp within the fog-lamp aperture and a vent screen within the front vent.

According to another aspect of the present invention, a bumper assembly for a vehicle includes a bumper fascia having inner and outer surfaces. A support member is welded to the inner surface and at least partially surrounds a fog-lamp aperture. The support member reinforces the bumper fascia proximate the fog-lamp aperture. An air curtain duct is integrally formed within the support member, the air curtain duct placing the outer surface in communication with a vehicle compartment.

According to another aspect of the present invention, a vehicle includes a bumper fascia having a fog-lamp aperture. A support member is welded to an inner surface of the bumper fascia for reinforcing the bumper fascia proximate the fog-lamp aperture. An air curtain duct is integrally formed within the support member, the air curtain duct selectively placing an outer surface of the bumper fascia in communication with a wheel well.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
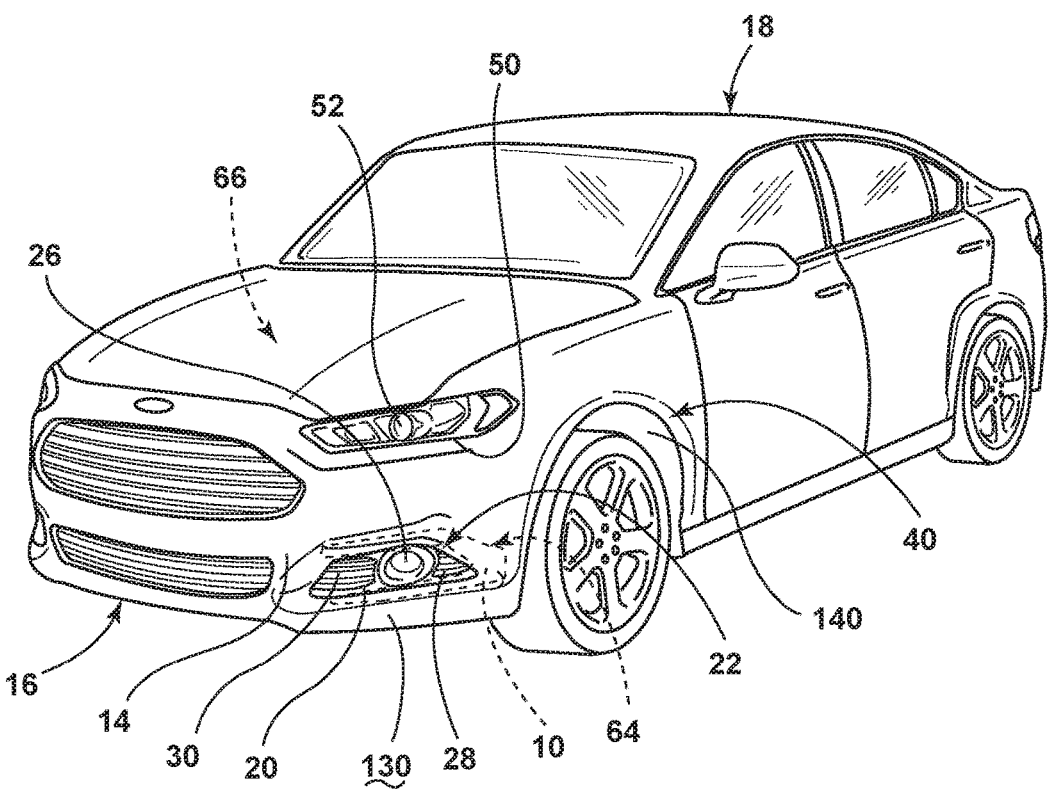
FIG. 1 is a front perspective view of a vehicle incorporating an aspect of the fog lamp support member.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
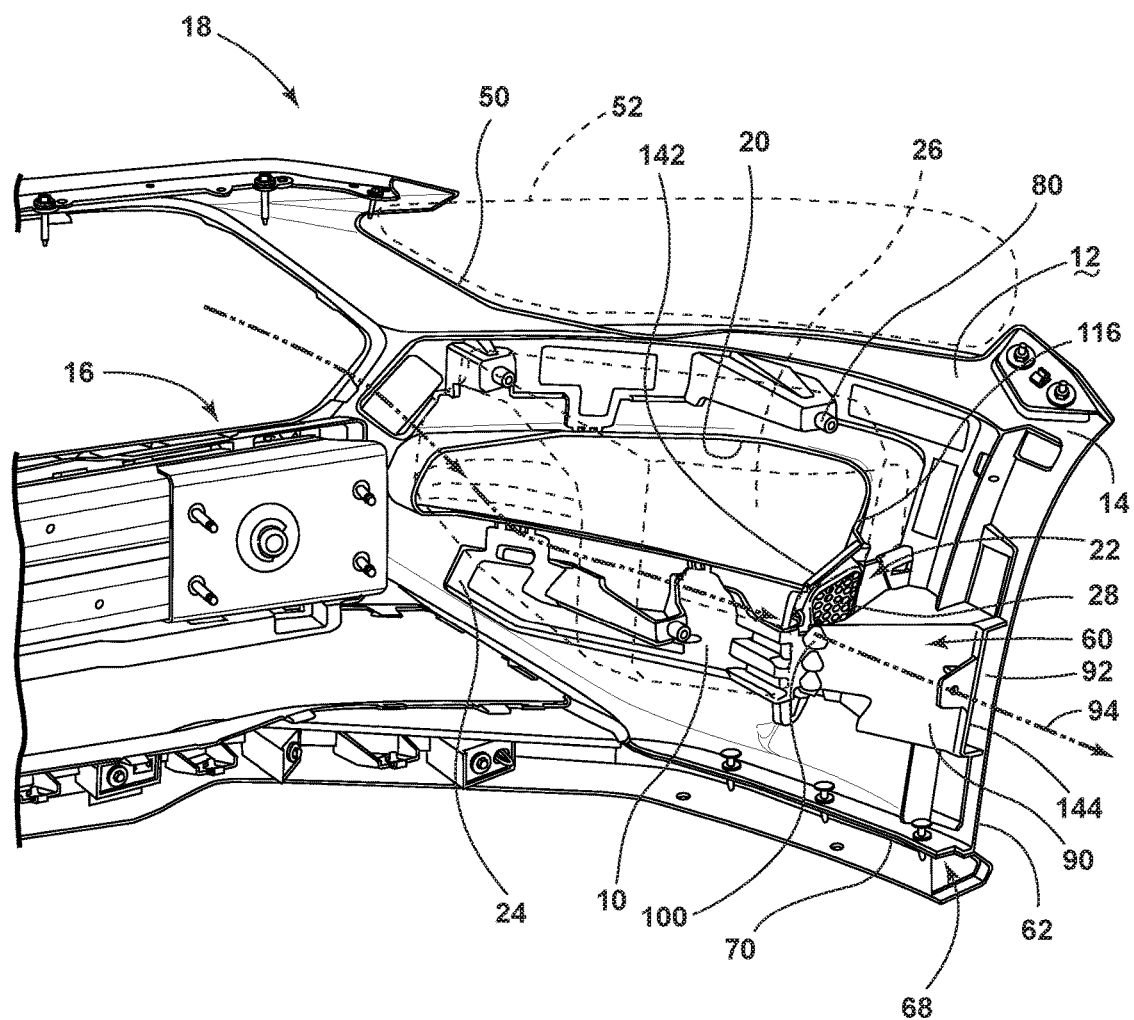
FIG. 2 is an interior perspective view of a bumper fascia and bumper assembly that incorporates an aspect of the fog lamp attachment bracket.
Figure 3:
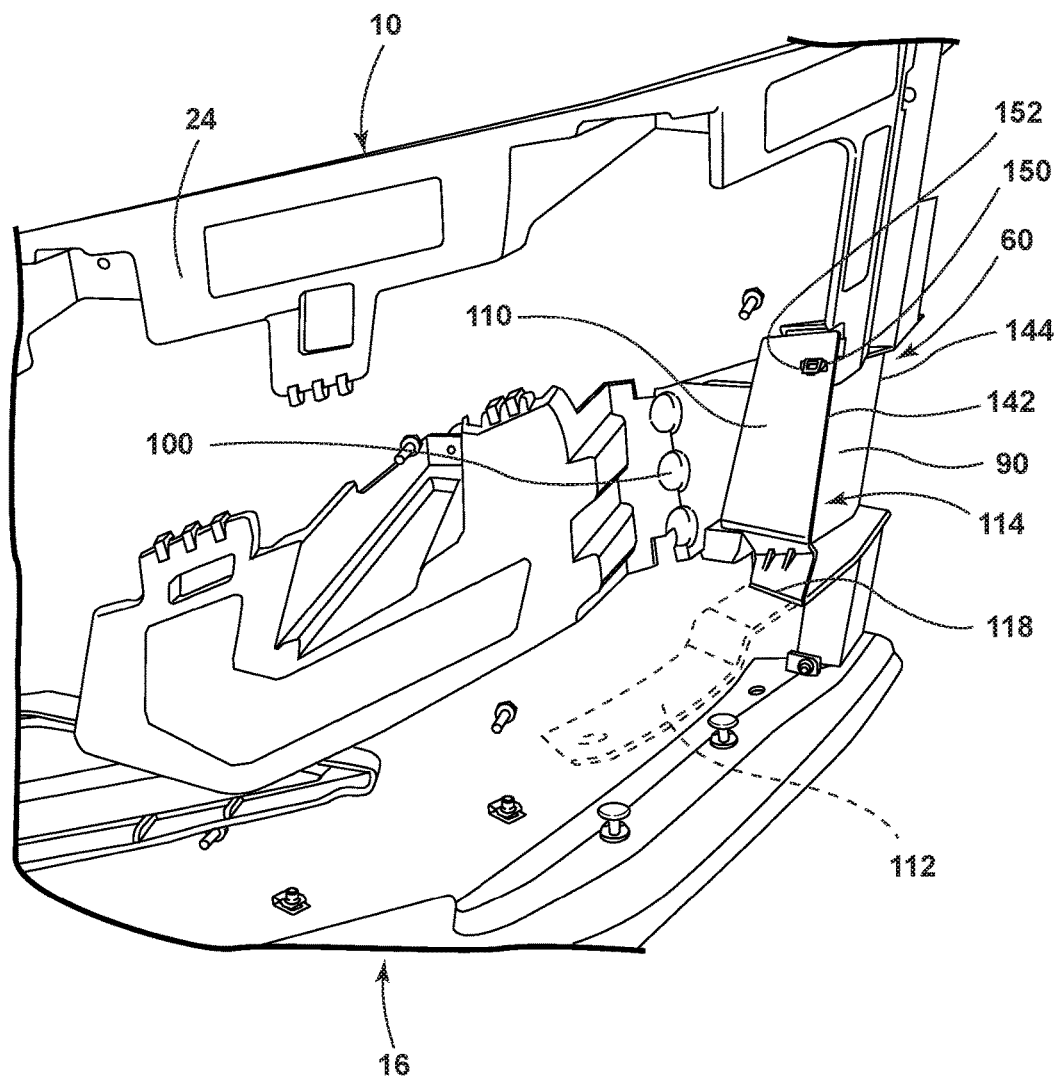
FIG. 3 is a partially exploded front perspective view of the bumper assembly of FIG. 2 illustrating operation of an operable panel for at least partially defining an air curtain duct.
Figure 4:
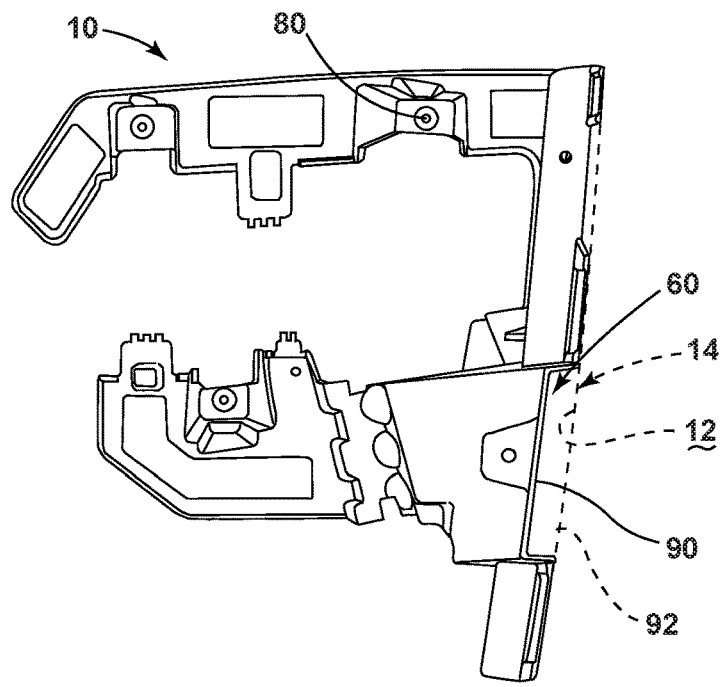
FIG. 4 is a rear perspective view of the fog lamp support member of FIG. 2.
Figure 5:
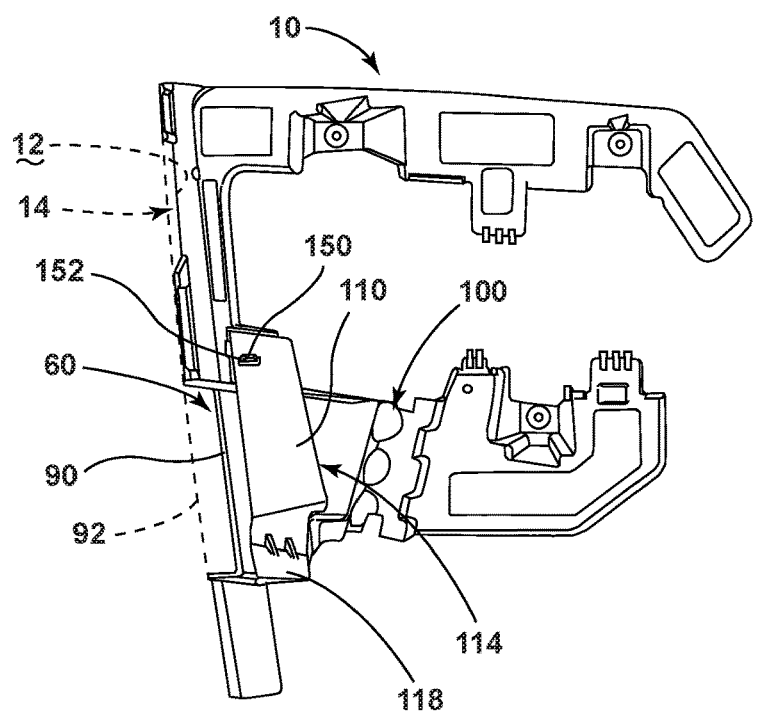
FIG. 5 is a front perspective view of the fog lamp support member of FIG. 2.
Figure 6:
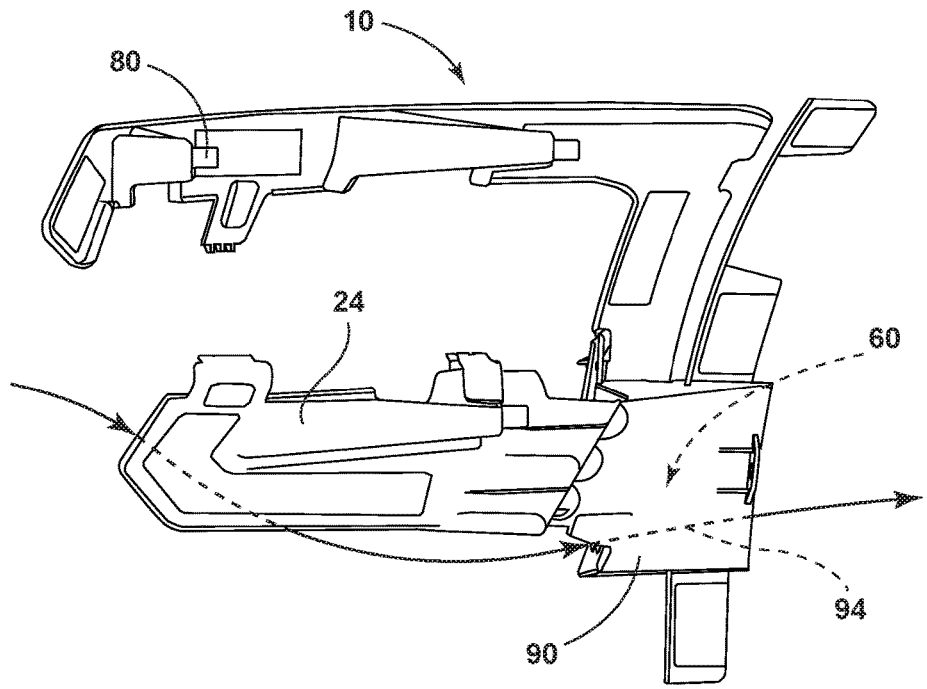
FIG. 6 is an interior side view of the fog lamp support member of FIG. 2.
Figure 7:
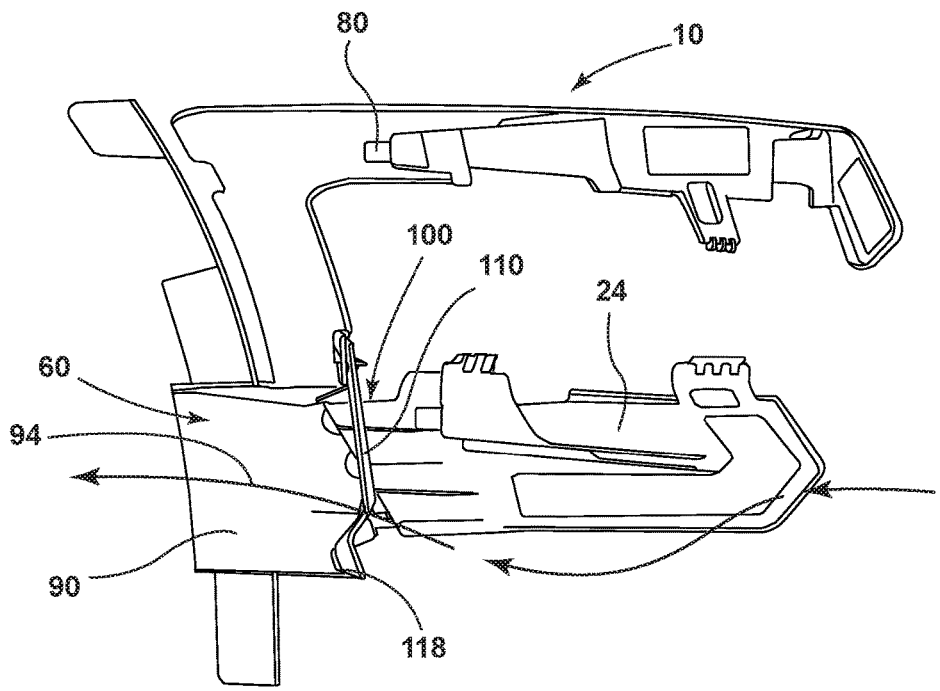
FIG. 7 is an exterior side view of the fog lamp support member of FIG. 2.
Figure 8:
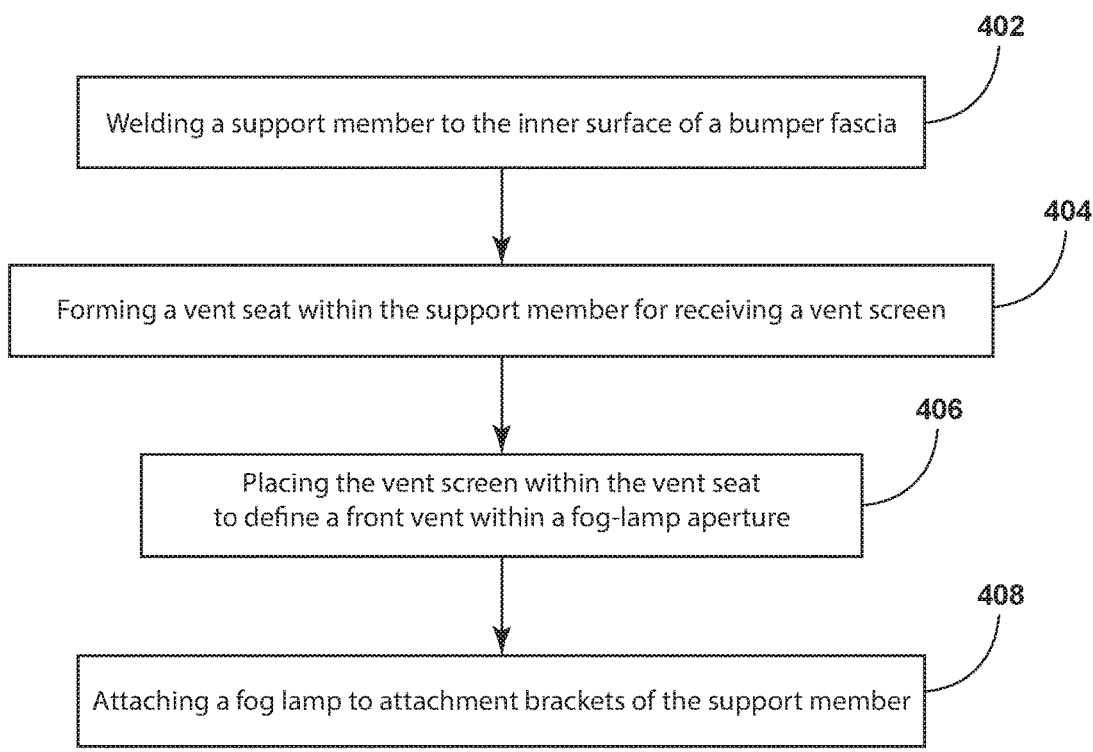
FIG. 8 is a schematic flow diagram illustrating a method for installing a fog lamp within a bumper fascia of a vehicle.

As shown in FIGS. 1-3, reference numeral 10 generally refers to a support member attached to an inner surface 12 of a bumper fascia 14 for a bumper assembly 16 of a vehicle 18. According to the various embodiments, the vehicle 18 can include a bumper fascia 14 having a fog-lamp aperture 20 wherein a front vent 22 is defined within the fog-lamp aperture 20. It is contemplated that the support member 10 can be disposed on the inner surface 12 of the bumper assembly 16. The support member 10 defines an outer frame 24 that supports a fog lamp 26 within the fog-lamp aperture 20 and also supports a vent screen 28 in the front vent 22. It is contemplated that the fog lamp 26 and the vent screen 28 can each occupy a portion of the fog-lamp aperture 20. In this manner, the fog-lamp aperture 20 can provide for the fog lamp 26, turn signals and other lighting fixtures 30 and can also provide for venting functions through the front vent 22 that improve the aerodynamics of the vehicle 18 proximate the bumper fascia 14 and the fog-lamp aperture 20.

Referring again to FIGS. 1-3, it is contemplated that the support member 10 can be attached to the inner surface 12 of the bumper assembly 16 through welding such that attachment of the support member 10 to the inner surface 12 of the bumper assembly 16 creates a substantially unitary and monolithic structure to which the fog lamp 26 and other lighting fixtures 30, as well as the vent screen 28 of the front vent 22, can attach. In this manner, the support member 10 being welded to the inner surface 12 of the bumper fascia 14 supports the positioning of the lighting fixtures 30 and also the front vent 22.

According to the various embodiments, by welding the support member 10 to the inner surface 12 of the front fascia, the support member 10 provides additional structural rigidity and/or support structure to the bumper fascia 14 and the bumper assembly 16 that reduces the amount of flexing or other deflection within the bumper fascia 14 around the fog-lamp aperture 20 and also around the area of the wheel well 40 for the vehicle 18. The additional support structure provided by the support member 10 also reduces the occurrence of sink marks within the bumper fascia 14 to allow a visible surface of the bumper fascia 14 to maintain a constant wall thickness throughout the bumper fascia 14.

Welding the support member 10 to the bumper fascia 14 can eliminate the need for fastening mechanisms for attaching the fog lamp 26 to the bumper fascia 14 or for attaching the support member 10 to the bumper fascia 14.

Referring again to FIGS. 1-3, the bumper assembly 16 can also define or at least partially define a headlamp aperture 50 disposed above the fog-lamp aperture 20. According to the various embodiments, the headlamp aperture 50 is adapted to support a headlamp 52 therein. The support member 10 for supporting the fog lamp 26, lighting fixtures 30, and front vent 22 is adapted to be free of engagement with the headlamp 52 and the headlamp aperture 50. In this manner, the welding of the support member 10 to the inner surface 12 of the bumper fascia 14 can occur after installation of the headlamp 52 within the headlamp aperture 50, or after installation of the headlamp 52 with the headlamp aperture 50. Accordingly, the installation of the support member 10 and/or the lighting fixtures 30 and the front vent 22 is not dependent upon the installation of the headlamp 52 within the headlamp aperture 50.

According to the various embodiments, the type of weld that is performed between the support member 10 and the inner surface 12 of the bumper fascia 14 can be any one of various welding methods that can include, but is not limited to, sonic welding, heat welding, induction welding, injection welding, combinations thereof, and other similar welding methods that can secure the support member 10 to the inner surface 12 of the bumper fascia 14.

Referring again to FIGS. 2-7, the support member 10 can define the outer frame 24 that in turn defines an integral air curtain duct 60 that supports the vent screen 28 and places an exterior 62 of the bumper assembly 16 in communication with an interior compartment 64 of the vehicle 18. It is contemplated that the interior compartment 64 of the vehicle 18 can include, but is not limited to, an engine compartment 66, wheel well 40, a cavity 68 within the frame 70 of the vehicle 18, combinations thereof, and other similar interior compartments 64 of the vehicle 18.

Referring again to FIGS. 2-7, the support member 10 is adapted to include the outer frame 24 that includes a plurality of fixture attachment points in the form of integral attachment brackets 80 defined within the support member 10. The fog lamp 26 and other lighting fixtures 30 can connect with these attachment brackets 80 to be secured by the outer frame 24 within the fog-lamp aperture 20. Portions of the outer frame 24, adjacent to the bumper fascia 14, can define a portion of the air curtain duct 60. Typically, the outer frame 24 can define the integral sides 90 of the air curtain duct 60. By way of example, where the air curtain duct 60 is generally rectilinear, the outer frame 24 can define three integral sides 90 of the air curtain duct 60. The remaining external side 92 of the air curtain duct 60, or the fourth external side 92, in the case of a rectilinear air curtain duct 60, is defined by the inner surface 12 of the bumper fascia 14. Accordingly, when the support member 10 is welded to the inner surface 12 of the bumper fascia 14, the engagement of the outer frame 24 with the inner surface 12 of the bumper fascia 14 defines the shape of the air curtain duct 60 that extends from a portion of the fog-lamp aperture 20 to the desired interior compartment 64 of the vehicle 18. Accordingly, a front vent 22 disposed within the fog-lamp aperture 20 can allow an air curtain 94 to pass through the air curtain duct 60 to promote aerodynamics of the vehicle 18 during operation.

According to the various embodiments, the configuration of the air curtain duct 60 may allow for a front vent 22 that can be used more efficiently to move air from the fog-lamp aperture 20 to allow for increased aerodynamics. The fog lamp 26 may be generally recessed within the fog-lamp aperture 20. The recessed fog lamp 26 creates drag that may negatively impact the aerodynamic performance of the vehicle 18. The inclusion of the front vent 22 proximate the air curtain duct 60 defined between the support member 10 and the inner surface 12 of the bumper fascia 14 mitigates this aerodynamic drag by promoting the flow of vent air in the form of an air curtain 94 from the fog-lamp aperture 20 to the interior compartment 64 of the vehicle 18. It is contemplated that the support member 10 can at least partially define a vent seat 100 that receives the vent screen 28 of the front vent 22. The vent seat 100 can be adapted to position the vent screen 28 of the front vent 22 rearward of the fog lamp 26. In this manner, the fog lamp 26 can be used to direct or funnel air toward the front vent 22 to define the air curtain 94 that travels through the air curtain duct 60.

Referring again to FIGS. 2-7, in order to further define the shape of the air curtain duct 60 and also define the vent seat 100, the support member 10 can include an operable flap 110 that is operable between a downward forming position 112 and an upward installed position 114. The use of the operable flap 110 can account for various tolerance differences during manufacture of various vehicles 18. The use of the operable flap 110 can be used to define the air curtain duct 60 and the vent seat 100 by allowing the manufacturer to adjust the positioning of the operable flap 110 in order to account for these manufacturing tolerances that may exist within certain vehicles 18, bumper assemblies, bumper fascias 14, vent screens 28, front vents 22, and other portions of a vehicle 18. It is contemplated that the operable flap 110 can be hingedly operable to at least partially define a duct opening 116 of the integral air curtain duct 60. This hinged connection can be in the form of a living hinge 118, where the operable flap 110 is integrally formed with the remainder of the support member 10. In such an embodiment, the living hinge 118 is an integral and molded portion of the support member 10 that is used to manipulate the operable flap 110 from the forming position 112 to the installed position 114.

Referring again to FIGS. 1-7, the bumper assembly 16 for the vehicle 18 can include the bumper fascia 14 that includes inner and outer surfaces 12, 130. The support member 10 is welded to the inner surface 12 and at least partially surrounds a fog-lamp aperture 20. The support member 10 is adapted to reinforce the bumper fascia 14 proximate the fog-lamp aperture 20. The air curtain duct 60 is integrally formed within at least a portion of the support member 10, where the air curtain 94 that places the outer surface 130 of the bumper fascia 14 in communication with an interior compartment 64 of the vehicle 18. As discussed above, the air curtain duct 60 is integrally formed within the support member 10 and also formed by a portion of the bumper fascia 14, where the inner surface 12 of the bumper fascia 14 forms at least one exterior side of the air curtain duct 60.

Referring again to FIGS. 1-7, it is contemplated that the interior compartment 64 can be a wheel well 40. In such an embodiment, the air curtain duct 60 extends through a wheel well liner 140 that defines at least a portion of the wheel well 40. As discussed above, the air curtain duct 60 selectively defines a movement of vent air, in the form of an air curtain 94, from near or proximate the outer surface 130 of the bumper fascia 14 to the wheel well 40. The air curtain duct 60 is adapted to maintain the air curtain 94 separate from the fog lamp 26 as it passes from the outer surface 130 of the bumper fascia 14 to the wheel well 40. It is contemplated that the bumper fascia 14 can include the duct opening 116 that defines an entry aperture 142 of the air curtain duct 60.

This entry aperture 142 can be defined by at least a portion of the fog-lamp aperture 20 and the front vent 22 disposed proximate the fog-lamp aperture 20. Typically, the vent seat 100 will define the entry aperture 142. It is also contemplated that the wheel well 40 can include an exit aperture 144 of the air curtain duct 60. In such an embodiment, the air curtain duct 60 can extend from the entry aperture 142 to the exit aperture 144 to allow for efficient flow of the air curtain 94 from the outer surface 130 of the bumper fascia 14 to the wheel well 40. This configuration of the air curtain duct 60 provides for the efficient and aerodynamic flow of air of the air curtain 94 from proximate or within the fog-lamp aperture 20 to the wheel well 40.

Referring again to FIGS. 1-7, the vehicle 18 can include the bumper fascia 14 with the fog-lamp aperture 20 defined therein. The support member 10 can be welded to the inner surface 12 of the bumper fascia 14 for reinforcing the bumper fascia 14 proximate the fog-lamp aperture 20. As discussed above, the support member 10 can include a plurality of lamp attachment brackets 80 that couple the fog lamp 26 and the other lighting fixtures 30 to the support member 10 and also support the fog lamp 26 within the fog-lamp aperture 20. An air curtain duct 60 is integrally formed within the support member 10, where the air curtain duct 60 selectively places the outer surface 130 of the bumper fascia 14 in communication with the wheel well 40. Accordingly, the fog lamp 26 and other lighting fixtures 30, which are typically at least partially recessed within the fog-lamp aperture 20 can be configured to at least partially funnel or direct the flow of vent air into the air curtain duct 60. In this manner, the recessed configuration of the fog lamp 26 and/or lighting fixtures 30 does not substantially contribute to the aerodynamic drag that may negatively affect the aerodynamic performance of the vehicle 18. Rather, the shape of the fog lamp 26 and other lighting fixtures 30 within the fog-lamp aperture 20 serves to direct the flow of air into the entry aperture 142 and through the air curtain duct 60 extending from the fog-lamp aperture 20 to the wheel well 40.

Referring again to FIGS. 2-7, it is contemplated that the operable flap 110 incorporated within the support member 10 can also be used to provide an engaging surface against which the vent screen 28 can be attached. Accordingly, the operable flap 110 can account for various tolerances that may exist within the front vent 22 and/or the vent screen 28 and also within portions of the bumper fascia 14. As the operable flap 110 is moved to the installed position 114, a tab 150 of the support member 10 can be attached with a clipping portion 152 of the operable flap 110. It is contemplated that the clipping portion 152 of the operable flap 110 can account for at least partial movement or adjustment of the operable flap 110 with respect to the remainder of the support member 10. This movement can account for the various tolerances within components of the vehicle 18 during manufacture. It is contemplated that once the operable flap 110 is fixed within position to at least partially define the air curtain duct 60, portions of the operable flap 110 are welded to the support member 10 and/or portions of the inner surface 12 of the bumper fascia 14 to define at least a portion of the air curtain duct 60. The ability to manipulate the exact positioning of the operable flap 110 about the living hinge 118 serves to minimize the occurrence of significant leaks within the air curtain duct 60 that may result in diminished aerodynamic performance, or excessive noise due to air from the air curtain 94 passing through these openings. Again, the use of the operable flap 110 serves to minimize the occurrence of the these openings to increase the aerodynamic performance and efficiency of the air curtain duct 60 extending from the fog-lamp aperture 20 to the wheel well 40.

According to the various embodiments, it is contemplated that the support member 10 can extend only partially around the fog-lamp aperture 20. By extending only partially around the fog-lamp aperture 20, a support member 10 can be afforded at least a minimal amount of play or adjustment as the support member 10 is positioned on and welded to the inner surface 12 of the bumper fascia 14. This minimal amount of play or adjustment within the support member 10 also allows for adjustment of the size and shape of the vent seat 100 and the air curtain duct 60 as the support member 10 engages the inner surface 12 of the bumper fascia 14 to define the air curtain duct 60.

According to various embodiments, it is contemplated that the support member 10 may extend entirely around the fog-lamp aperture 20. Typically, the support member 10 will extend at least partially around the fog-lamp aperture 20. It is also contemplated that the support member 10 can be made of plastic, polymers, various formable materials, combinations thereof, and other similar materials that can be integrally welded to the inner surface 12 of the bumper fascia 14 to provide additional support to the bumper fascia 14.

According to the various embodiments, it is contemplated that use of the support member 10 as a structural reinforcement for the bumper fascia 14 serves to provide certain areas of thickening of the bumper fascia 14 through the welding of the support member 10 to the bumper fascia 14. Accordingly, through the use of the welded support member 10, the bumper fascia 14 can be formed to have a substantially consistent thickness throughout the entire bumper fascia 14 or at least throughout portions surrounding the fog-lamp aperture 20. By having the support member 10 welded to the inner surface 12 of the bumper fascia 14, these portions are essentially thickened through the integral and welded engagement of the support member 10 to the bumper fascia 14. Accordingly, this thickened portion of the bumper fascia 14 and support member 10 provides a substantially robust connection point for the fog lamp 26, light fixtures and front vent 22 that may be disposed within the fog-lamp aperture 20.

Having described the various aspects of the support member 10 disposed proximate the fog-lamp aperture 20, a method 400 is disclosed for attaching a fog lamp 26 to a bumper fascia 14. According to the method 400, a support member 10 is welded to the inner surface 12 of the bumper fascia 14 proximate the fog-lamp aperture 20 (step 402). As discussed above, by welding the support member 10, the support member 10 forms an integral portion of the bumper fascia 14 and provides reinforcement for the bumper fascia 14 against deflection during operation of the vehicle 18. According to the method 400, a vent seat 100 is formed within a portion of the support member 10 for receiving a vent screen 28 (step 404). In this manner, the vent screen 28 being placed within the vent seat 100 defines the front vent 22 within the fog lamp-aperture 20 of the bumper fascia 14 (step 406). The fog lamp 26 is then attached to the attachment brackets 80 that are integrally defined within the support member 10 (step 408). Through this configuration, the fog lamp 26 can be positioned in a relatively forward position to the fog-lamp aperture 20. The fog lamp 26 is thereby adapted to direct or funnel air within the fog-lamp aperture 20 and toward the vent screen 28 of the front vent 22, which is also disposed within the fog-lamp aperture 20. To receive the vent air, the front vent 22 is disposed rearward of the fog lamp 26 to receive the funneled or directed air. Through this configuration, the fog lamp 26 can serve to direct the vent air in the form of the air curtain 94 into the air curtain duct 60 to promote the aerodynamic performance of the vehicle 18 while also providing for effective use of the fog lamp 26 and other lighting fixtures 30 within the fog-lamp aperture 20.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
    a bumper fascia having a fog-lamp aperture; and
    a fog-lamp support member disposed on an inner surface of a bumper assembly, the fog-lamp support member defining an outer frame that supports a fog lamp and a vent screen within the fog-lamp aperture, wherein the fog-lamp support member defines an enclosed integral air-curtain duct that extends from the vent screen and into a wheel well via an aperture in a wheel well liner.

2. The vehicle of claim 1, wherein the fog-lamp support member is welded to the inner surface of the bumper assembly.

3. The vehicle of claim 1, wherein the bumper assembly includes a headlamp aperture disposed above the fog-lamp aperture, the headlamp aperture adapted to support a headlamp therein, wherein the fog-lamp support member is free of engagement with the headlamp and the headlamp aperture.

4. The vehicle of claim 1, wherein the outer frame of the fog-lamp support member defines the integral air-curtain duct that supports the vent screen and places an exterior of the bumper assembly in communication with a wheel well of the vehicle.

5. The vehicle of claim 4, wherein the integral air-curtain duct extends to the wheel well between the inner surface of the bumper fascia and the fog-lamp support member.

6. The vehicle of claim 1, wherein the fog-lamp support member defines a support structure of the bumper assembly proximate the fog-lamp aperture.

7. The vehicle of claim 2, wherein the fog-lamp support member is sonically welded to the inner surface of the bumper assembly.

8. The vehicle of claim 4, wherein the integral air-curtain duct includes an operable flap that is hingedly operable to define a duct opening of the integral air-curtain duct, wherein the operable flap at least partially encloses the integral air-curtain duct.

9. The vehicle of claim 8, wherein the operable flap hingedly engages the integral air-curtain duct at a living hinge.

10. A bumper assembly for a vehicle comprising:
    a bumper fascia having inner and outer surfaces;
    a support member welded to the inner surface at a fog-lamp aperture and at least partially surrounding the fog-lamp aperture, the support member reinforcing the bumper fascia proximate the fog-lamp aperture; and
    an air-curtain duct integrally formed and enclosed between the support member and the inner surface, the air-curtain duct placing the fog-lamp aperture in communication with a vehicle compartment.

11. The bumper assembly of claim 10, wherein the vehicle compartment is a wheel well, wherein the air-curtain duct extends from the fog-lamp aperture and through a wheel well liner that defines the wheel well.

12. The bumper assembly of claim 10, wherein the support member is positioned proximate a headlamp aperture defined within the bumper fascia, wherein the support member is free of engagement with the headlamp aperture and a headlamp positioned within the headlamp aperture.

13. The bumper assembly of claim 10, further comprising:
    a fog lamp disposed within the fog-lamp aperture, wherein the support member includes a plurality of lamp attachments that couple the fog lamp to the support member and support the fog lamp within the fog-lamp aperture.

14. The bumper assembly of claim 10, wherein the air-curtain duct includes an operable flap that is hingedly operable relative to the support member to define a duct opening of the integral air-curtain duct.

15. The bumper assembly of claim 14, wherein the operable flap hingedly engages the integral air-curtain duct at a living hinge.

16. A vehicle comprising:
    a bumper fascia having a fog-lamp aperture;
    a fog-lamp support member welded to an inner surface of the bumper fascia for reinforcing the bumper fascia proximate the fog-lamp aperture; and
    an air-curtain duct integrally formed within the fog-lamp support member, the air-curtain duct extending from the fog-lamp aperture to a wheel well, wherein the air-curtain duct is at least partially enclosed between the fog-lamp support member and wheel well.

17. The vehicle of claim 16, further comprising:
    a fog lamp disposed within the fog-lamp aperture, wherein the fog-lamp support member includes a plurality of lamp attachments that couple the fog lamp to the fog-lamp support member and support the fog lamp within the fog-lamp aperture.

18. The vehicle of claim 17, wherein the air-curtain duct selectively defines a movement of vent air from proximate the fog-lamp aperture to the wheel well, wherein the air-curtain duct maintains the vent air separated from the fog lamp.

19. The vehicle of claim 16, wherein the bumper fascia includes a front vent that defines an air-curtain entry aperture, and wherein the wheel well includes an air-curtain exit aperture, the air-curtain duct extending from the air-curtain entry aperture to the air-curtain exit aperture.

20. The vehicle of claim 16, wherein the air-curtain duct includes an operable flap that is hingedly operable relative to the fog-lamp support member to define a duct opening of the air-curtain duct, and wherein the operable flap hingedly engages the air-curtain duct at a living hinge.

* * * * *